United States Patent
Nemec et al.

(10) Patent No.: US 11,872,916 B2
(45) Date of Patent: Jan. 16, 2024

(54) DAMPER SYSTEM FOR SUSPENSION OF VEHICLE SEAT

(71) Applicant: Seats Incorporated, Reedsburg, WI (US)

(72) Inventors: Benjamin Nemec, Reedsburg, WI (US); Kole Wacker, Richland Center, WI (US)

(73) Assignee: SEATS INCORPORATED, Reedsburg, WI (US)

( * ) Notice: Subject to any disclaimer, the term of this patent is extended or adjusted under 35 U.S.C. 154(b) by 123 days.

(21) Appl. No.: 17/481,850

(22) Filed: Sep. 22, 2021

(65) Prior Publication Data

US 2022/0089071 A1 Mar. 24, 2022

Related U.S. Application Data (60) Provisional application No. 63/082,593, filed on Sep. 24, 2020.

(51) Int. Cl.
*B60N 2/50* (2006.01)
*B60N 2/52* (2006.01)

(52) U.S. Cl.
CPC ............ *B60N 2/508* (2013.01); *B60N 2/502* (2013.01); *B60N 2/505* (2013.01); *B60N 2/522* (2013.01)

(58) Field of Classification Search
None
See application file for complete search history.

(56) References Cited

U.S. PATENT DOCUMENTS

| | | | | |
|---|---|---|---|---|
| 3,716,213 A | * | 2/1973 | Lacey | B60N 2/52 248/564 |
| 4,272,117 A | * | 6/1981 | Vilbeuf | B60N 2/525 296/65.02 |
| 5,651,580 A | | 7/1997 | LaPointe et al. | |
| 6,340,152 B1 | * | 1/2002 | Ritchie | B60N 2/525 188/300 |
| 7,246,836 B2 | | 7/2007 | Hahn | |
| 7,413,158 B1 | | 8/2008 | Burer | |
| 8,585,004 B1 | * | 11/2013 | Roeglin | F16M 11/38 296/68.1 |
| 10,654,381 B2 | | 5/2020 | Lorey et al. | |
| 11,009,096 B2 | | 5/2021 | Lamoureux et al. | |
| 2009/0283944 A1 | * | 11/2009 | Schordine | B60N 2/522 267/140.11 |

(Continued)

FOREIGN PATENT DOCUMENTS

| | | |
|---|---|---|
| EP | 0457520 A2 | 11/1991 |
| EP | 1050428 A1 | 11/2000 |

(Continued)

OTHER PUBLICATIONS

European Patent Office, Extended Search Report, Application No. 21198926.4, dated Jan. 31, 2022, 7 pages.

*Primary Examiner* — David E Allred
(74) *Attorney, Agent, or Firm* — Quarles & Brady LLP (57) ABSTRACT

The present disclosure provides a damper system for a suspension of a vehicle seat. A linkage of the damper system can be configured to cause a damper to provide different damping characteristics when the suspension moves towards a neutral position than when the suspension moves away from the neutral position.

20 Claims, 5 Drawing Sheets

(56) References Cited

U.S. PATENT DOCUMENTS

2012/0090930 A1\* 4/2012 Haller ..................... B60N 2/52
                                                          188/280
2018/0001804 A1   1/2018 Lorey
2020/0108751 A1   4/2020 Dotzler et al.

FOREIGN PATENT DOCUMENTS

| EP | 3552872 A1 | | 10/2019 |
|---|---|---|---|
| FR | 2568200 A1 | \* | 1/1986 |
| JP | H04221234 A | | 8/1992 |
| WO | 2004045900 A2 | | 6/2004 |

\* cited by examiner

DAMPER SYSTEM FOR SUSPENSION OF VEHICLE SEAT

CROSS-REFERENCES TO RELATED APPLICATIONS

The present application is based on, claims priority to, and incorporates herein by reference in its entirety, U.S. Provisional Patent Application No. 63/082,593 filed Sep. 24, 2020, entitled "Damper System for Suspension of Vehicle Seat."

BACKGROUND

Vehicle seats may sometimes include suspensions that allow the seats to move relative to a support frame or relative to a cab in which the seats are installed. In some installations, it may be useful to provide damper systems for the suspensions, including to slow the movement of the seats, as guided by the suspensions, in response to ground contours, changes in loading on the seats, and so on.

SUMMARY

Some aspects of the invention can provide a damper system for a suspension for a vehicle seat, the suspension being configured to move upward and downward relative to a neutral position.

According to one aspect of the present disclosure, a suspension for a vehicle seat, to move a seat portion of the vehicle seat relative to a neutral position, is provided. The suspension can include a damping linkage and a damper. The damping linkage can be coupled between a base of the suspension and a suspension member that is configured to support the seat portion of the vehicle seat relative to the base. The damper can be coupled between the base and the damping linkage. The damping linkage can include a first damping link, a second damping link, and an intermediate damping link. The first damping link can be coupled between the base and the damper. The second damping link coupled between the suspension member and the intermediate damping link. The intermediate damping link can be pivotally coupled between the second damping link and the damper. The first, second, and intermediate damping links can cooperate to actuate the damper in a first direction when the suspension is moved in an upward direction away from the neutral position and when the suspension is moved in a downward direction away from the neutral position.

In some aspects, a damper can be configured to provide a first damping force profile when actuated in a first direction and a second damping force profile when actuated in an opposing second direction. In some aspects, the first damping force profile can provide a greater damping force relative to the second damping force profile.

In some aspects, a suspension member can be a first scissor link in a scissor linkage. The first scissor link and a second scissor link of the scissor linkage can pivot relative to each other during upward and downward movement of a suspension relative to a neutral position, so that the first scissor link moves a damper via a damping linkage.

In some aspects, a first damping link can be pivotally coupled to a base at a first end of the first damping link.

In some aspects, a first damping link can include a protrusion extending from a first end. The protrusion can be configured to engage a portion of a base to limit rotation of the first damping link, relative to the base, at a predetermined position.

According to one aspect of the present disclosure, a suspension for a vehicle seat, to move a seat portion of the vehicle seat upward and downward relative to a neutral position, is provided. The suspension can include a damper configured to provide damping primarily when moved in a first direction corresponding to extension or compression of the damper, and a linkage secured to the damper and configured to be secured between a support member of the suspension and a base of the suspension. The linkage can be configured to cause the damper to move in the first direction when the seat portion is moved upward from the neutral position and when the seat portion is moved downward from the neutral position.

In some aspects, a linkage can be configured to cause the damper to move in a second direction opposite a first direction when the suspension is moved upward toward the neutral position and when the suspension is moved downward toward the neutral position.

In some aspects, a linkage includes a base link, an intermediate link, and a suspension link. The base link can be configured to be secured to a base at a first end and be pivotally secured to a damper and to the intermediate link at a second end. The intermediate link cab be pivotally secured to the damper and to the base link at a first end and be pivotally secured to the suspension link at a second end. The suspension link can be pivotally secured to the intermediate link at a first end and be configured to be secured to a movable suspension member of a suspension at a second end.

In some aspects, a first end of a base link can be configured to be rigidly secured to a base and a second end of the base link can include an arcuate slot that slidably receives a pin to secure a damper and an intermediate link.

In some aspects, a support member of a suspension can be a scissor link of a scissor linkage.

In some aspects, a damper can be configured to provide a first damping profile when moved in a first direction corresponding to extension or compression of the damper and to provide a second damping profile when moved in a second direction opposite the first direction. In some aspects, the first damping profile can be different from the second damping profile.

In some aspects, when a suspension is in a neutral position, a linkage can be configured to place a damper in a minimum extension position or a maximum extension position.

In some aspects, a linkage is configured to prevent a damper from being compressed beyond a minimum extension position or being extended beyond a maximum extension position.

According to one aspect, a suspension for a vehicle seat, to move a seat portion of the vehicle seat in an upward and downward direction relative to a neutral position, is provided. The suspension can include a linkage coupled between a base and a movable suspension member of the suspension. The linkage can include a first damping link, a second damping link, and an intermediate link. The first damping link can be pivotally coupled to the base and to an end of a damper. The second damping link can be coupled to the movable suspension member of the suspension and to the intermediate link. The intermediate link can be pivotally coupled to the second damping link and to the end of the damper. The first damping link can be configured to pivot in a first rotational direction to actuate the damper in a first direction when the suspension is moved away from the neutral position.

In some aspects, a first damping link can be configured to pivot in an opposing second rotational direction to actuate a damper in a second direction opposite a first direction when a suspension is moved toward a neutral position.

In some aspects, a damper can be configured to provide a first damping force profile when actuated in a first direction and a second damping force profile when actuated in a second direction.

In some aspects, a first damping force profile can provide a greater damping force relative to a second damping force profile.

In some aspects, a suspension is a scissors-type suspension and a movable suspension member is included in a set of scissor linkages.

In some aspects, each of the scissor linkages in a set can include a first scissor link and a second scissor link that pivot relative to each other during movement of a suspension. The movable suspension member can be one of the first or second scissor links.

In some aspects, when a suspension is in a neutral position, the linkage is configured to place a damper in a minimum extension position.

In some aspects, a first damping link includes a protrusion extending from an end adjacent to a base. The protrusion can be configured to engage a portion of the base to limit rotation of the first damping link relative to the base at a predetermined position, thereby defining a maximum extension position of a damper.

In some aspects, a seat for a vehicle can include a damper system and a suspension, including as generally described above.

BRIEF DESCRIPTION OF THE DRAWINGS

The accompanying drawings, which are incorporated in and form a part of this specification, illustrate aspects of the invention and, together with the description, serve to explain the principles of aspects of the invention.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other implementations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

The following discussion is presented to enable a person skilled in the art to make and use aspects of the invention. Various modifications to the illustrated implementations will be readily apparent to those skilled in the art, and the generic principles herein can be applied to other implementations and applications without departing from the scope of the disclosed technology. Thus, aspects of the invention are not intended to be limited to the implementations shown, but are to be accorded the widest scope consistent with the principles and features disclosed herein. The following detailed description is to be read with reference to the figures, in which like elements in different figures have like reference numerals. The figures, which are not necessarily to scale, depict selected implementations and are not intended to limit the scope of aspects of the invention. Skilled artisans will recognize the examples provided herein have many useful alternatives and fall within the scope of aspects of the invention.

Some figures may include multiple instances of similar structures or structural relationships. For convenience of presentation, in select figures, only some of these similar structures or relationships may be specifically labeled with a reference number. One of skill in the art will recognize that the features not labeled with reference numbers can include similar aspects and perform similar functions to similar features that are labeled with reference numbers.

As noted above, some vehicle seats can include suspensions that can allow seating portions and other components of the seats to move relative to a reference structure. For example, some seat suspensions can allow a seat portion of a seat to move upward or downward relative to a vehicle cab in which the seat is installed, such as may improve comfort during travel over rough surfaces or may otherwise comfortably accommodate operators of different sizes.

In some conventional designs, it may be useful to include a damper system for a seat suspension, with the damper system configured to slow movement of the seat suspension—and, correspondingly, the motion of the seat itself— during operation. Damper systems can be useful, for example, to reduce the speed of an upward movement of the seat such as during terrain-induced bouncing. As another example, damper systems can be useful to reduce the speed of a downward movement of the seat, including during return to a neutral position after an upward bounce or as an operator enters (i.e., introduces his or her weight onto) the seat.

In some cases, damping may be particularly useful to mitigate the effect of suspension springs on a seat movement. For example, some seat suspensions may include springs that tend to bias the suspension—and the seat in general—in an upward direction. This may be useful, for example, to adequately support the weight of an operator during use of the seat. However, the upward bias of the springs may tend to result in increased speed of upward movement of the seat, such as when a bump in a road temporarily reduces the downward force on the seat from the weight of an operator. In this regard, as well as many others, damper systems can help to improve ride quality among other benefits.

Some aspects of the invention can include damper systems that provide the benefits noted above, while also improving on conventional designs in other ways. For example, although use of a damper system to mitigate the spring force of a suspension can be useful in some cases, as briefly discussed above, it may be detrimental to ride quality (or otherwise) in other cases. For example, when a suspension has been moved to lower a seat, restrictions by a damper system on spring force of the suspension may tend to slow the return of the seat to a more elevated position (i.e., generally in an upward direction). For this and other reasons, it may be useful for a damper system for a suspension to apply a dampening force primarily (e.g., only) during certain movements of the suspension.

Correspondingly, some aspects of the invention can include a damper system in which a linkage (e.g., one or more connected links) connect a damper to movable members of the suspension such that the damper is primarily (e.g., only) active when the suspension is moving in a particular direction or over a particular range. For example, some implementations can include a linkage that is arranged so that a damper is at a reference (e.g., minimum) position when the suspension is at a neutral (e.g., middle) position and the damper moves in only a single direction (e.g., extension or compression) when the suspension moves away from the neutral position and moves in a different direction (e.g., retraction or extension) when the suspension moves toward the neutral position. For example, a linkage can be arranged so that a damper is at a reference position corresponding to a minimum extension of the damper (e.g., a minimum operational extension) when the suspension is at a neutral position, and so that the damper can be extended by the linkage away from the reference position when the suspension moves away from the neutral position, regardless of whether the suspension movement corresponds to a raising or a lowering of the seat. Further, the damper can be compressed by the linkage toward the reference position when the suspension moves back toward the neutral position, again regardless of whether the suspension movement corresponds to a raising or a lowering of the seat. Or, in other cases, a linkage can be arranged so that a damper is at a reference position corresponding to a maximum extension of the damper (e.g., a maximum operational extension) when the suspension is at a neutral position. As such, this alternative arrangement may operate to compress a damper when a suspension moves away from a neutral position and extend the damper when the suspension moves toward the neutral position. In this regard, for example, a damper that provides damping primarily (e.g., only) when moved in a single direction (e.g., extension or compression) can be configured to provide a damping force for a suspension when the suspension is moving away (or towards) a neutral position.

Generally, a damper can be considered as providing damping primarily in one direction if the damper is configured to provide more damping force in response to a movement in that one direction than in response to a corresponding movement (e.g., with equivalent speed and distance) in a different direction. As noted above, in some cases, a damper that primarily provides damping force in one direction may only provide damping force in one direction.

Figure 1:
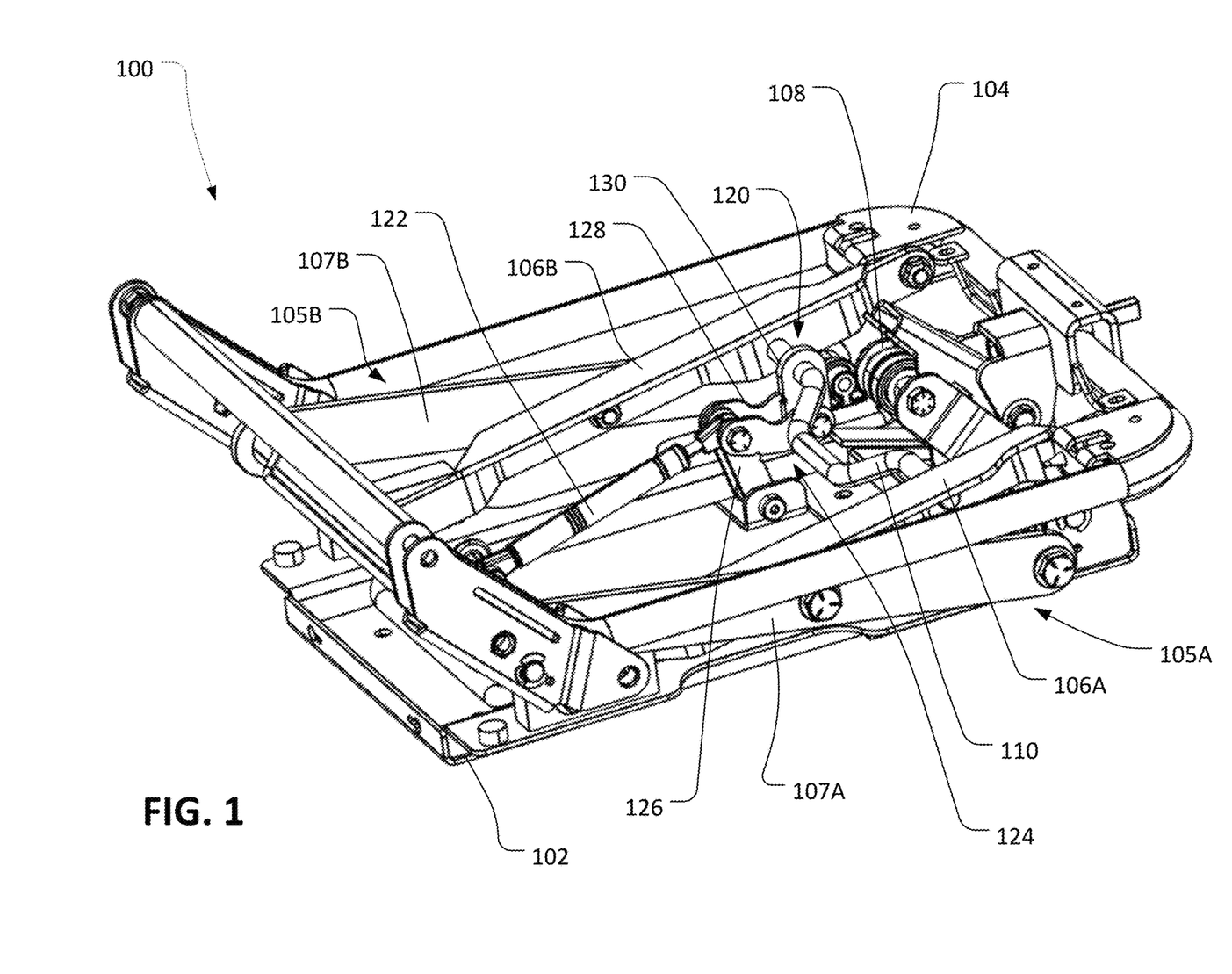
FIG. 1 is an isometric view of a suspension for a vehicle seat, including a damper system according to an aspect of the invention.
Figure 2A:
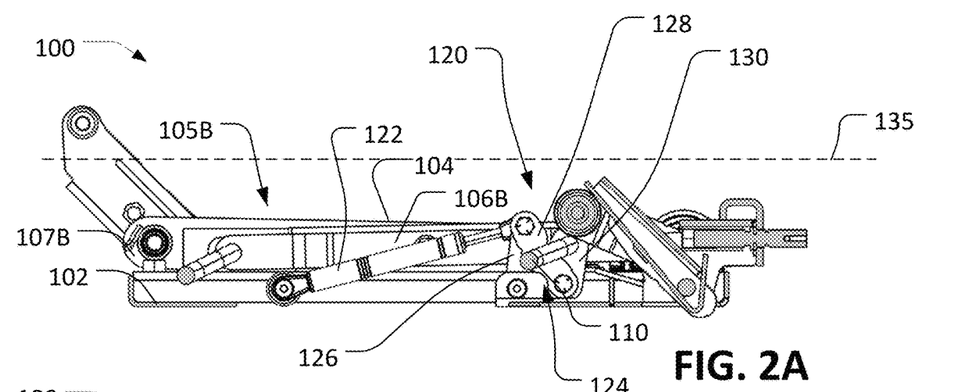
FIGS. 2A-2C are side elevation cross-sectional views of the suspension of FIG. 1 in a lowered position, a neutral position, and a raised position, respectively.
Figure 2B:
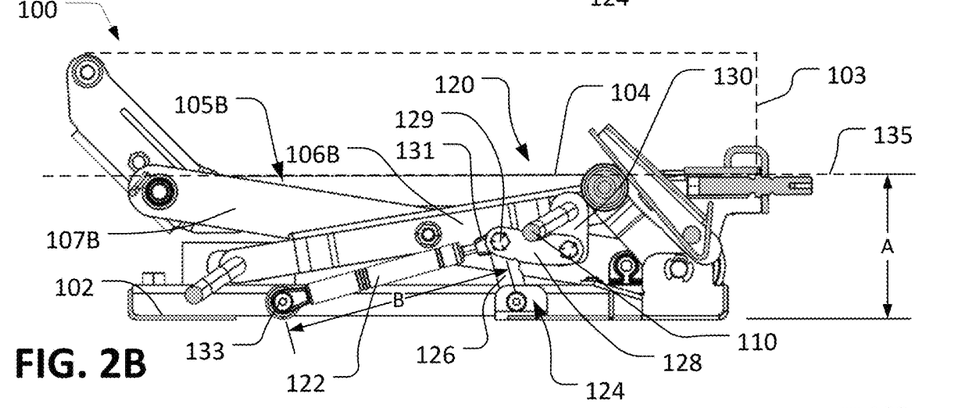

FIG. 1 illustrates an example suspension 100 for a seat for a vehicle, such as can be securely installed in a vehicle cab via a base 102 of the suspension 100 and can support a seat portion of a seat (e.g., a seat portion 103 as shown in FIG. 2B, but potentially of a variety of other configurations) via a support portion 104. The suspension 100 includes movable suspension members that are configured to support the seat portion of the vehicle seat relative to the base 102 and move as the suspension is moved upward and downward relative to the base 102. In the illustrated example, the movable suspension members are included in a scissors-type suspension. The scissors-type suspension can include a set of scissor linkages 105A, 105B including crossed, pivotally connected suspension members. The pivotally connected suspension members of each of the scissor linkages 105A, 105B includes a first scissor link 106A, 106B pivotally coupled to a second scissor link 107A, 107B such that the first and second scissor links 106A/B, 107A/B pivot relative to each other during upward and downward movement of the suspension 100. The suspension 100 can also include clock or torsion springs 108 to bias the suspension 100 upwards toward a raised position. In other examples, however, a variety of other configurations are possible including other scissors-type suspensions, suspensions with other types of linkages to raise or lower a seat, suspensions with different types or arrangement of springs, and so on.

The suspension 100 also includes a damper system 120. In particular, the damper system 120 includes a damper 122 and a linkage 124. The linkage 124 can be coupled between a base 102 of the suspension 100 and at least one of the suspension members. The damper 122 can be coupled between the base 102 and the linkage 124. In the illustrated example, the linkage 124 is connected to the damper 122, the base 102, and to the suspension members, in this case, in the form of the scissor linkages 105A, 105B. In the illustrated example, the linkage 124 is connected to a front, upper portion of each of the first scissor links 106A, 106B via a cross bar 110 spanning between the first scissor links 106A, 106B, although other configurations are possible.

Generally, the damper 122 is configured to operate in different damping modes and thereby provide different damping force profiles (e.g., different damping rates or forces for a comparable input movement or force) depending on which direction the damper 122 is being moved (e.g., depending on whether the damper is being extended or compressed). In the illustrated example, the damper 122 is configured to provide a first damping force profile when actuated by the linkage 124 in a compression direction and a second damping force profile when actuated in an opposing extension direction. According to some examples, the first damping force profile can be configured to provide a greater damping force relative to the second damping profile. In other words, the first damping profile can provide a greater damping force for a given input movement or force relative to the second damping profile for the same given input movement or force. Although a particular configuration of the damper 122 is shown, any variety of known dampers can be used in other examples.

In some examples, a damper can be a one-way damper: i.e., a damper that primarily (e.g., only) provides damping when being actuated in a particular direction. For example, some dampers can be configured to provide damping primarily when actuated in extension. However, other examples may exhibit other configurations. For example, some dampers can primarily provide damping when actuated in compression, or can otherwise provide different amounts of damping (e.g., different damping rates or forces) depending on the direction of movement.

Generally, as also noted above, a linkage according to aspects of the invention can be configured to connect a damper to one or more suspension members so that the damper is only extended (or retracted) when a suspension is moved away from a reference (e.g., neutral) position and is only compressed (or extended) when the suspension is moved toward the reference (e.g., neutral) position, or vice versa. Correspondingly, when a damper is configured to primarily (e.g., only) provide damping when extended (or compressed), examples of the invention can result in movement of a suspension being primarily (e.g., only) dampened by the damper when the suspension is moving toward (or away) from a neutral position.

Continuing with regard to FIG. 1, the linkage 124 can include one or more damping links. In the illustrated example, the damping links include a base link 126, an intermediate link 128, and a suspension link 130. The base link 126 can be coupled between the base 102 and the damper 122, the suspension link 130 can be coupled between the first scissor link 106A, 106B and the intermediate link 128, and the intermediate link 128 can be coupled between the suspension link 130 and the damper 122. As best illustrated in FIG. 2B, the base link 126 is pivotally secured to the base 102 at a first end (e.g., at a bracket rigidly coupled to the base 102) and is pivotally secured to the damper 122 and to the intermediate link 128 at an opposing second end. The intermediate link 128 is pivotally secured to the damper 122 and the base link 126 at a first end and is pivotally secured to the suspension link 130 at an opposing second end. The suspension link 130 is pivotally secured to the intermediate link 128 at a first end and is rigidly secured to the suspension members 160A, 106B, via the cross bar 110, at an opposing second end. According to some examples, a suspension link can be integrally formed into one of the moveable suspension members (e.g., first or second scissor links 106, 107). According to other examples, a suspension link can be configured as a bracket rigidly coupled to one of the moveable suspension members.

In the illustrated example, the base link 126 and the intermediate link 128 are both coupled to an end of the damper 122 by a common pin 129 (e.g., a fastener). According to other examples, separate pins or other known connections can be used. Further, in the illustrated example, the damper 122 is arranged such that the linkage 124 is coupled to the damper 122 at a rod end 131 of the damper 122 and the damper 122 is coupled to the base 102 at an opposite end 133. According to other examples, the damper 122 can be arranged in an opposite orientation, such that the linkage 124 is coupled to the opposite end 133 of the damper 122 and the base 102 is coupled to the rod end 131 of the damper 122.

Figure 3A:
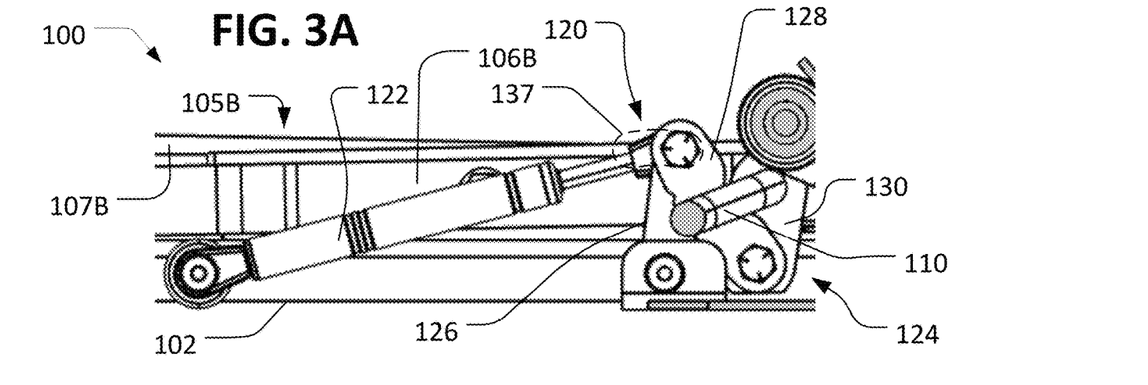
FIGS. 3A-3C are enlarged views of the damper system of FIG. 1, shown from the perspective of FIGS. 2A-2C, respectively.
Figure 3B:
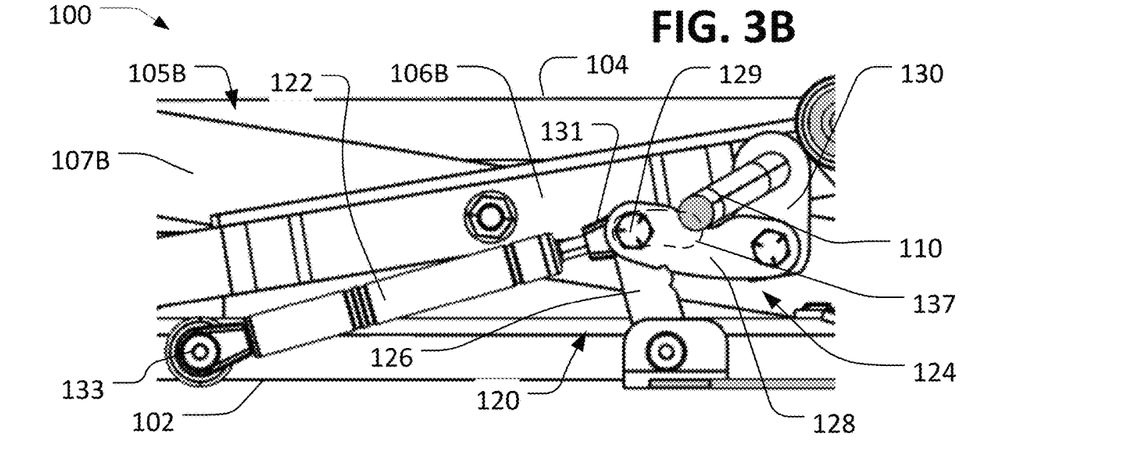

As shown in FIGS. 2B and 3B, when the suspension 100 is at a neutral position, the linkage 124 is configured so that the damper 122 is at a reference extension. The neutral position can be defined as the static position of the suspension 100 under a particular load (e.g., of an operator to which the suspension 100 has been tuned), such that the suspension 100 oscillates upwards and downwards relative to the neutral position during dynamic events (e.g., bounce from road undulations). In particular, for the illustrated example, the neutral position can correspond to a height of a top of a seat-support platform of the suspension 100 when the suspension 100 is under a reference downward load (e.g., when loaded with the weight of an operator). According to some examples, the neutral position of the suspension 100 can correspond to a mid-ride of the suspension (i.e., halfway between a fully raised and fully lowered position of the suspension). For example, the neutral position of the suspension 100 can correspond to the position of the suspension 100 reached when the suspension springs (e.g., springs 108) are appropriately adjusted to bring a seated operator statically to a middle of the suspension stroke (i.e., to a tuned mid-ride position). As shown in FIG. 2B in particular, the neutral position can correspond to a reference line 135 at a vertical height A between the base 102 and the support portion 104.

As illustrated in FIGS. 2A-3C relative to the reference line 135 (not shown in FIGS. 3A-3C), the suspension 100 can move upward and downward relative to the neutral position. In the illustrated example, the neutral position of the suspension 100 is approximately a middle position. Further, a reference extension of the damper 122, as corresponds to the neutral position of the suspension 100, corresponds to a minimum operational extension position for the damper 122 (e.g., which may or may not correspond to an absolute minimum-extension/maximum-compression position). In particular, the minimum operational extension (and reference) position for the illustrated example can be defined as the end-to-end length B of the damper 122 when the suspension 100 is in the neutral position. According to some examples, as also noted above, the minimum operational extension position corresponds to a fully compressed damper. According to other examples, the minimum operational extension position corresponds to the most compressed position (e.g., the least extended position) of the damper 122 relative to the position of the damper 122 throughout all other suspension positions within the operational range of travel of the suspension 100.

Referring to FIGS. 2A and 3A, as the suspension 100 lowers the seat (not shown) in a downward direction (e.g., from the perspective of FIG. 2A), moving away from the neutral position, the linkage 124 moves to actuate the damper 122 to extend the damper 122 in a first direction. The actuation of the damper 122 is caused by the vertical lowering of the suspension member (e.g., the first scissor link 106), which in turn vertically lowers the suspension link 130 by virtue of the coupling therebetween. The lowering of the suspension link 130, in turn, rotates the intermediate link 128 in a first rotational direction (e.g., a clockwise direction from the perspective of FIG. 2A). The rotation of the intermediate link 128 rotates the base link 126 in the first rotational direction to extend the damper 122 in the first direction. Correspondingly, the damper 122 will dampen the downward movement of the suspension 100 (e.g., by providing the first damping force profile when actuated in the first direction), thereby assisting the upward force provided by the springs 108 (or other factors) and, in some cases, helping to ensure that the suspension 100 does not bottom out.

In contrast, however, when the suspension is raised in an upward direction (e.g., from the perspective of FIG. 2A) back toward the neutral position (e.g., from the position of FIGS. 2A and 3A) the linkage 124 moves to actuate the damper 122 to compress the damper 122 in an opposing second direction. The actuation of the damper 122 is caused by the vertical raising of the suspension member (e.g., the first scissor link 106), which in turn vertically raises the suspension link 130 by virtue of the coupling therebetween. The raising of the suspension link 130, in turn, rotates the intermediate link 128 in an opposing second rotational direction (e.g., a counter-clockwise direction from the perspective of FIG. 2A). The rotation of the intermediate link 128 rotates the base link 126 in the second rotational direction to compress the damper 122 in the second direction. Correspondingly, the damper 122 will dampen the movement differently than when being extended (e.g., will not dampen or will otherwise provide less damping) during the upward movement of the suspension 100 back toward the neutral position (e.g., by providing the second damping force profile when actuated in the second direction) and the springs may be able to relatively quickly return the suspension, and thereby the seat coupled thereto, to the neutral position of FIGS. 2B and 3B.

Figure 2C:
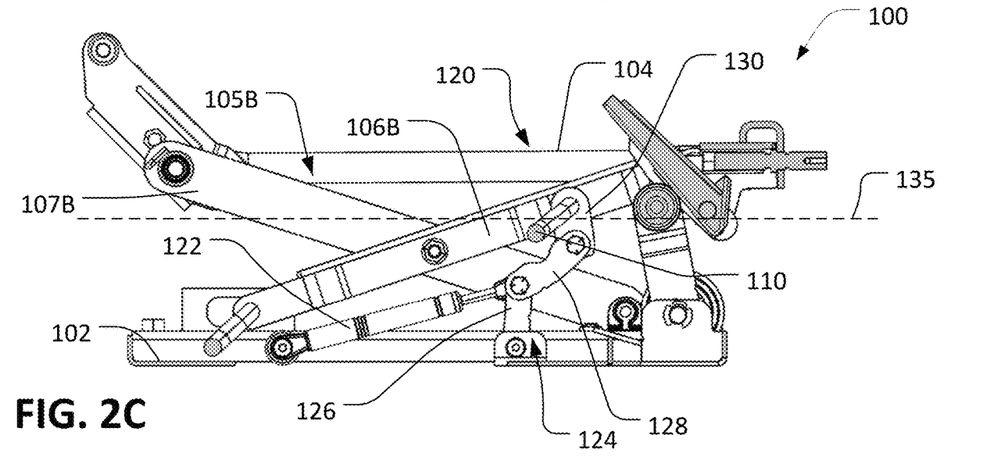
Figure 3C:
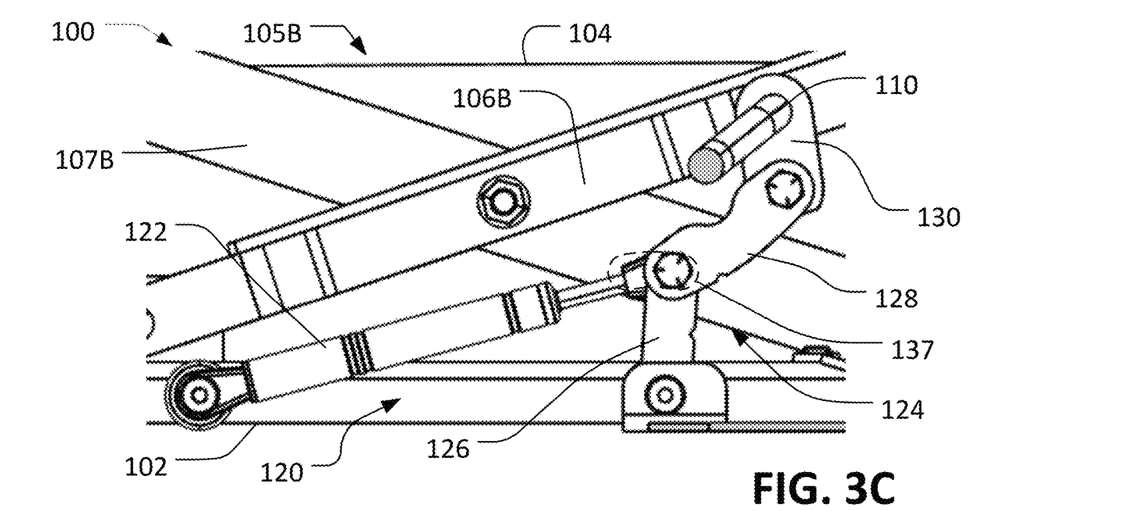

Referring now to FIGS. 2C and 3C, as the suspension 100 raises a seat (not shown) in an upward direction (e.g., from the perspective of FIG. 2C), again moving away from the neutral position, the linkage 124 also moves to actuate the damper 122 to extend the damper 122 in the first direction. When the suspension is raised away from the neutral position, the actuation of the damper 122 is caused by the vertical raising of the suspension member (e.g., the first scissor link 106), which in turn vertically raises the suspension link 130 by virtue of the coupling therebetween. The raising of the suspension link 130, in turn, rotates the intermediate link 128 in the second rotational direction (e.g., a counter-clockwise direction from the perspective of FIG. 2A). The rotation of the intermediate link 128 rotates the base link 126 in the first rotational direction (e.g., a clockwise direction) to extend the damper 122 in the first direction. Correspondingly, the damper 122 will dampen the upward movement of the suspension 100 (e.g., by providing the first damping force profile when actuated in the first direction), thereby mitigating the upward force provided by the springs 108 (or other factors) and, in some cases, helping to ensure that the suspension 100 does not top out or otherwise provide an excessive upward bounce to an operator.

In contrast, however, when the suspension is lowered in a downward direction (e.g., from the perspective of FIG. 2C) back toward the neutral position (e.g., from the position of FIGS. 2C and 3C) the linkage 124 moves to actuate the damper 122 to compress the damper 122 in the second direction. When the suspension is lowered towards the neutral position, the actuation of the damper 122 is caused by the vertical lowering of the suspension member (e.g., the first scissor link 106), which in turn vertically lowers the suspension link 130 by virtue of the coupling therebetween. The lowering of the suspension link 130, in turn, rotates the intermediate link 128 in the first rotational direction (e.g., a clockwise direction from the perspective of FIG. 2A). The rotation of the intermediate link 128 rotates the base link 126 in the second rotational direction (e.g., a counter-clockwise direction) to compress the damper 122 in the second direction. Correspondingly, the damper 122 will dampen the movement differently than when being extended (e.g., will not dampen or will otherwise provide less damping) during the upward movement of the suspension 100 (e.g., by providing the second damping force profile when actuated in the second direction) and the springs may provide relatively more significant (e.g., the primary) resistance to a return to the neutral position of FIGS. 2B and 3B.

Consistent with the discussion above, when the suspension 100 moves away from the neutral position, whether in an upward or downward direction, the linkage 124 moves to actuate the damper 122 in the first direction, and when the suspension 100 moves toward the neutral position, whether in an upward or downward direction, the linkage 124 moves to actuate the damper in the second direction. Thus, as the suspension moves past the neutral position in either direction, the damper 122 will transition, via movement of the linkage 124, between different damping force profiles (e.g., from not damping to damping). Correspondingly, due to the general operation of the damper system 120, the damper 122 may tend to reduce the duration and magnitude of oscillation about a neutral position for any given suspension event. Further, as the suspension moves past the neutral position in either direction, the linkage 124 acts to transition the damper 122 from moving in one direction to moving in an opposite direction. Thus, the damper 122 will not be actuated (e.g., compressed) beyond the minimum operational extension position.

With reference to FIGS. 3A-3C, the base link 126 can define an arcuate path of motion 137, which helps to define the overall movement of the damper 122. That is, in the illustrated example, although the intermediate link 128 acts to move the base link 126, and thereby the damper 122, it is the base link 126 that proscribes the path of the motion of the damper 122.

Figure 4A:
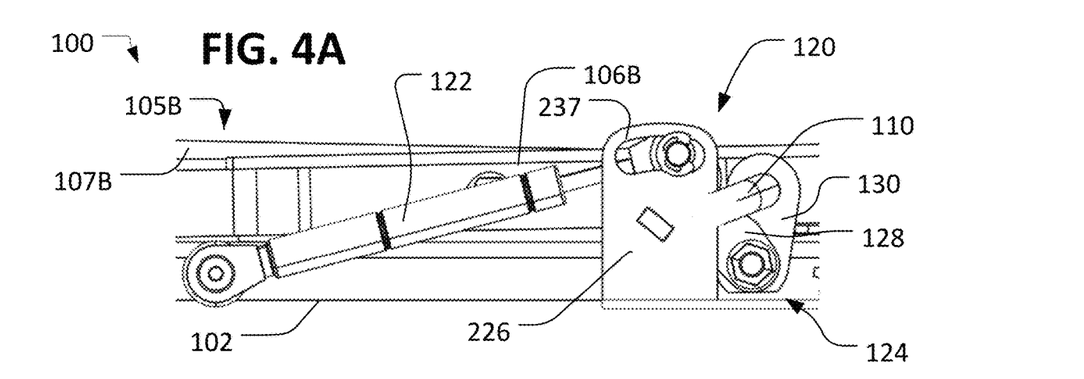
FIGS. 4A-4C are enlarged side elevation cross-sectional views of a suspension for a vehicle seat, including a damper system having a link that includes a guiding slot.
Figure 4B:
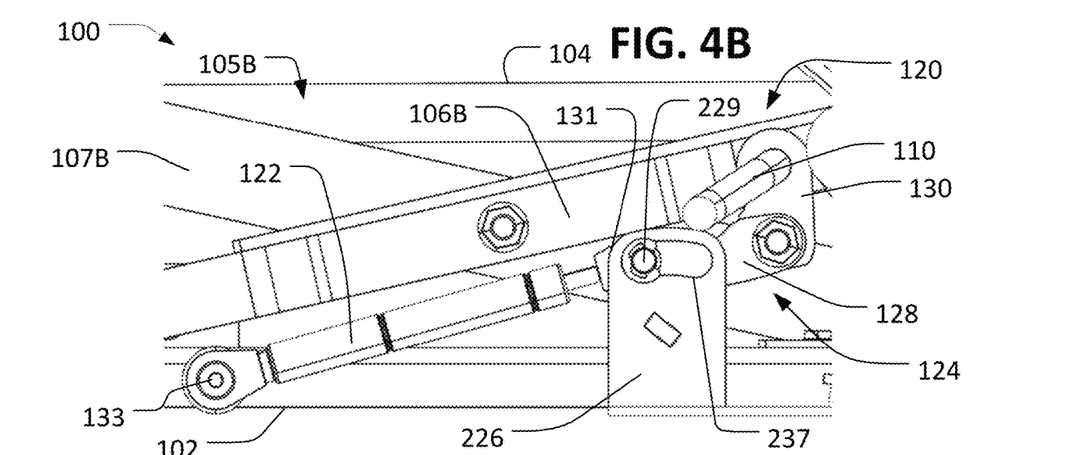
Figure 4C:
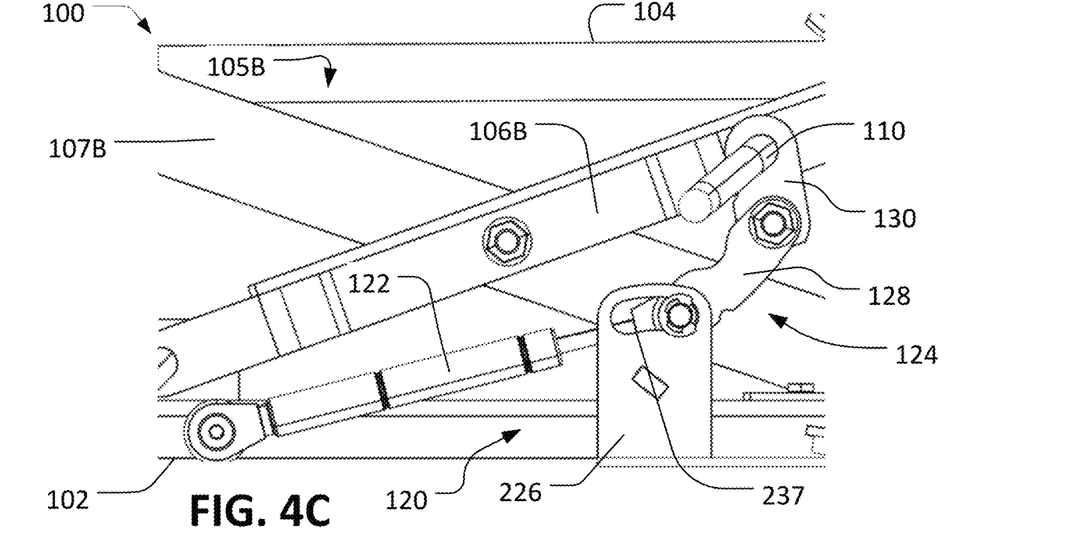

FIGS. 4A-4C illustrate the suspension 100 with a different configuration of the linkage 124 that includes a base link 226 that is rigidly coupled to the base 102. The linkage 124 illustrated in FIGS. 4A-4C generally operates in the same way as the linkage 124 described with respect to FIGS. 1-3C, with the exception that the base link 226 is configured to be rigidly attached to (e.g., integrally formed with) the base 102 of the suspension 100, despite performing a similar guiding function as the base link 126 in the linkage 124 of FIGS. 2A-2C. In the illustrated example, a first end of the base link 226 is rigidly secured to the base 102 of the suspension 100 and an opposing second end of the base link 226 includes an arcuate slot 237 that can slidably receive a pin 229 to secure the damper 122 and the intermediate link 128. The arcuate slot 237 can define the same arcuate path of motion as the base link 126 of FIGS. 3A-3C. In the illustrated example, the intermediate link 128 acts to move the damper 122, and the base link 226 guides the motion of the damper 122 along the arcuate slot 237 such that when the suspension 100 is lowered (FIG. 4A) or raised (FIG. 4C) relative to the neutral position (FIG. 4B), the pin 229 slides along the slot and the damper 122 is extended or compressed.

In some cases, the arcuate slot 237 can be a circular slot, extending along a circular path between opposing ends thereof. In some case, the slot 237 can be sized so that the pin 229 does not contact opposing ends of the slot 237 at the opposing limits of travel of the suspension 100 or so that the slot 237 does not itself otherwise provide a travel stop for the suspension 100 at the opposing limits of travel.

Figure 5:
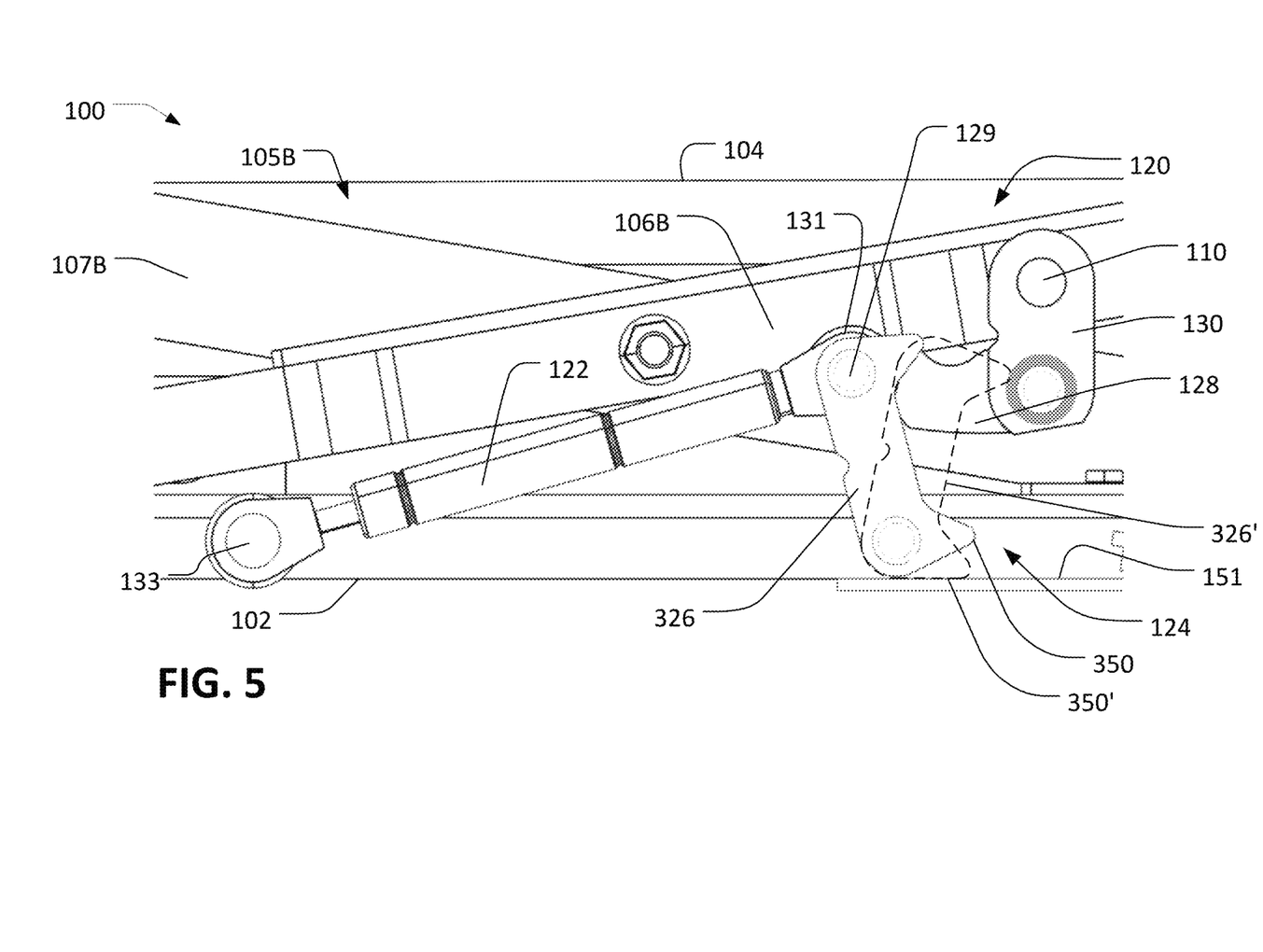
FIG. 5 is an enlarged side elevation cross-sectional view of a suspension of a vehicle seat, including a damper system having a link that includes toggle prevention features.

FIG. 5 illustrates another configuration of the linkage 124 that includes a base link 326 that is pivotally coupled to the base 102. The linkage 124 illustrated in FIG. 5 generally operates in the same way as the linkage 124 described with respect to FIGS. 1-3C, with the exception that the base link 326 includes anti-toggle features to prevent the linkage 124 from entering a toggle position. Generally, the base link 326 operates similarly to the base link 126 to guide movement of the damper 122. However, in the illustrated example, the base link 326 also includes a protrusion 350 extending outwardly from an end of the base link 326 adjacent to the base 102. The protrusion 350 is configured to engage a portion of the base 102 to stop rotation of the base link 326 relative to the base 102 at a predetermined position (i.e., to limit a range of rotation of the base link 326 and thereby limit a range of movement of the linkage 124 overall). In the illustrated example, the predetermined position of the base link 326 is illustrated in broken lines with the base link 326' having a protrusion 350'.

In the predetermined position, the protrusion 350' of the base link 326' engages a surface 151 of the base 102 to stop further movement of the linkage 124. Correspondingly, extending the above discussion of FIGS. 1-4C, when the predetermined position of the base link 326' defines a maximum operational extension position of the damper 122. Thus, the maximum operational extension position for the arrangement of FIG. 5 (e.g., when the suspension 100 is in a maximum upward or downward position) can be defined as the end-to-end length of the damper 122 when the protrusion 350 of the base link 326 is engaged with the base 102 (i.e., as shown with the protrusion 350'). According to some examples, the maximum operational extension position corresponds to a fully extended damper. According to other examples, the maximum operational extension position corresponds to the most extended position of the damper 122 relative to the position of the damper 122 throughout all other suspension positions within the range of travel of the suspension 100.

Thus, the disclosed damper system can provide various benefits compared to conventional systems, including through selective application of damping primarily to certain types or ranges of movement of a seat suspension. Although the particular configuration illustrated in the FIGS. may be particularly useful in some contexts, other configurations are also possible. For example, some damper systems may be configured, under similar principles, so that a damper provides similar damping only when being compressed. As another example, some damper systems may be tuned (or may be tunable) so that a reference position does not necessarily correspond to a neutral or center position for an associated suspension.

The previous description of the disclosed examples is provided to enable any person skilled in the art to make or use the invention. Various modifications to these examples will be readily apparent to those skilled in the art, and the generic principles defined herein may be applied to other examples without departing from the spirit or scope of the invention. Thus, the invention is not intended to be limited to the examples shown herein but is to be accorded the widest scope consistent with the principles and novel features disclosed herein.

The invention claimed is:

1. A suspension for a vehicle seat, to move a seat portion of the vehicle seat relative to a neutral position, the suspension comprising:
   a damping linkage coupled to a base of the suspension and a suspension member that is configured to support the seat portion of the vehicle seat relative to the base;
   a damper including a base end and a head end, the damper coupled to the base and the damping linkage; and
   the damping linkage comprising a first damping link, a second damping link, and an intermediate damping link, the first damping link including a first and a second end, with:
      the first damping link coupled to the base at the first end of the first damping link and coupled to the damper at the second end of the first damping link;
      the second damping link connecting the suspension member and the intermediate damping link; and
      the intermediate damping link pivotally coupled to the second damping link and the first damping link,
   wherein the first, second, and intermediate damping links cooperate to actuate the damper in a first direction when the suspension is moved in an upward direction away from the neutral position and when the suspension is moved in a downward direction away from the neutral position,
   wherein the first damping link is configured to maintain a lengthwise substantially upright orientation extending upwardly from the base and defining an arcuate path for the head end of the damper either by an arcuate rotation of the first damping link about the base end or by an arcuate slot in the second end of the first damping link, and
   wherein the arcuate path maintains the head end of the damper above the base end of the damper.

2. The suspension of claim 1, wherein the damper is configured to provide a first damping force profile when actuated in the first direction and a second damping force profile when actuated in an opposing second direction, the first damping force profile providing a greater damping force relative to the second damping force profile.

3. The suspension of claim 2, wherein the suspension member is a first scissor link in a scissor linkage; and
   wherein the first scissor link and a second scissor link of the scissor linkage pivot relative to each other during upward and downward movement of the suspension relative to the neutral position, so that the first scissor link moves the damper via the damping linkage.

4. The suspension of claim 1, wherein the first damping link is pivotally coupled to the base at the first end of the first damping link, and
   wherein the first damping link includes a protrusion extending from the first end, the protrusion configured to engage a portion of the base to limit rotation of the first damping link, relative to the base, at a predetermined position.

5. A suspension for a vehicle seat, to move a seat portion of the vehicle seat upward and downward relative to a neutral position, the suspension comprising:
   a damper including a base end and a head end, the damper configured to provide damping primarily when moved in a first direction corresponding to extension or compression of the damper; and
   a linkage secured to the damper and configured to be secured to a support member of the suspension and a base of the suspension; and
   the linkage being configured to cause the damper to move in the first direction when the seat portion is moved upward from the neutral position and when the seat portion is moved downward from the neutral position,
   wherein the linkage includes a base link, an intermediate link, and a suspension link,
   wherein the base link includes a first end and a second end and is configured to be secured to the base at the first end and secured to the head end of the damper at the second end,
   wherein the intermediate link is pivotally secured to the base link and the suspension link,
   wherein the suspension link is configured to be secured to a movable suspension member of the suspension,
   wherein the base link is configured to maintain a lengthwise substantially upright orientation extending upwardly from the base and defining an arcuate path for the head end of the damper either by an arcuate rotation of the base link about the base end or by an arcuate slot in the second end of the base link, and
   wherein the arcuate path maintains the head end of the damper above the base end of the damper.

6. The suspension of claim 5, wherein the linkage is further configured to cause the damper to move in a second direction opposite the first direction when the suspension is moved upward toward the neutral position and when the suspension is moved downward toward the neutral position.

7. The suspension of claim 5,
wherein the base link is pivotally secured to the damper and to the intermediate link at the second end of the base link;
wherein the intermediate link is pivotally secured to the damper; and
wherein the suspension link is pivotally secured to the intermediate link at a first end of the suspension link and is configured to be secured to the movable suspension member of the suspension at a second end of the suspension link.

8. The suspension of claim 7, wherein the first end of the base link is configured to be rigidly secured to the base and the second end of the base link includes an arcuate slot that slidably receives a pin to secure the damper and the intermediate link.

9. The suspension of claim 5, wherein the support member of the suspension is a scissor link of a scissor linkage.

10. The suspension of claim 5, wherein the damper is configured to provide a first damping profile when moved in the first direction and to provide a second damping profile when moved in a second direction opposite the first direction, the first damping profile being different from the second damping profile.

11. The suspension of claim 5, wherein when the suspension is in a neutral position that corresponds to the neutral position of the vehicle seat, the linkage is configured to place the damper in a minimum extension position.

12. The suspension of claim 11, wherein the linkage is configured to prevent the damper from being compressed beyond the minimum extension position.

13. A suspension for a vehicle seat, to move a seat portion of the vehicle seat in an upward and downward direction relative to a neutral position, the suspension comprising:
a damper including a base end configured to be coupled to a base of the suspension and a head end; and
a linkage coupled to the base and a movable suspension member of the suspension, the linkage comprising:
a first damping link, a second damping link, and an intermediate link;
the first damping link comprising a first end and a second end, the first damping link being pivotally coupled to the base at the first end of the first damping link and pivotally coupled to the head end of the damper at the second end of the first damping link; and
the second damping link connecting the movable suspension member of the suspension and the intermediate link,
wherein the intermediate link is pivotally coupled to the second damping link and the first damping link,
wherein the first damping link is configured to maintain a lengthwise substantially upright orientation that extends upwardly from the base and is configured to pivot in a first rotational direction about the first end to define an arcuate path for the head end of the damper, to actuate the damper in a first direction when the suspension is moved away from the neutral position, and
wherein the arcuate path maintains the head end of the damper above the base end of the damper.

14. The suspension of claim 13, wherein the first damping link is configured to pivot in a first rotational direction to actuate the damper in the first direction when the suspension is moved away from the neutral position regardless of whether the suspension moves the vehicle seat in the upward direction or the downward direction; and
wherein the first damping link is further configured to pivot in an opposing second rotational direction to actuate the damper in a second direction opposite the first direction when the suspension is moved toward the neutral position regardless of whether the suspension moves the vehicle seat in the upward direction or the downward direction.

15. The suspension of claim 14, wherein the damper is configured to provide a first damping force profile when actuated in the first direction and a second damping force profile when actuated in the second direction.

16. The suspension of claim 15, wherein the first damping force profile provides a greater damping force relative to the second damping force profile.

17. The suspension of claim 13, wherein the suspension is a scissors-type suspension and the movable suspension member is included in a set of scissor linkages.

18. The suspension of claim 17, wherein each of the scissor linkages in the set includes a first scissor link and a second scissor link that pivot relative to each other during movement of the suspension; and
wherein the movable suspension member is one of the first or second scissor links.

19. The suspension of claim 13, wherein when the suspension is in the neutral position, the linkage is configured to place the damper in a minimum extension position.

20. The suspension of claim 13, wherein the first damping link includes a protrusion extending from an end adjacent to the base, the protrusion being configured to engage a portion of the base to limit rotation of the first damping link relative to the base at a predetermined position, thereby defining a maximum extension position of the damper.

* * * * *